Dec. 6, 1927.
P. VOREAUX
1,651,913
HAND ACTUATED AIR COMPRESSOR
Filed April 27, 1925
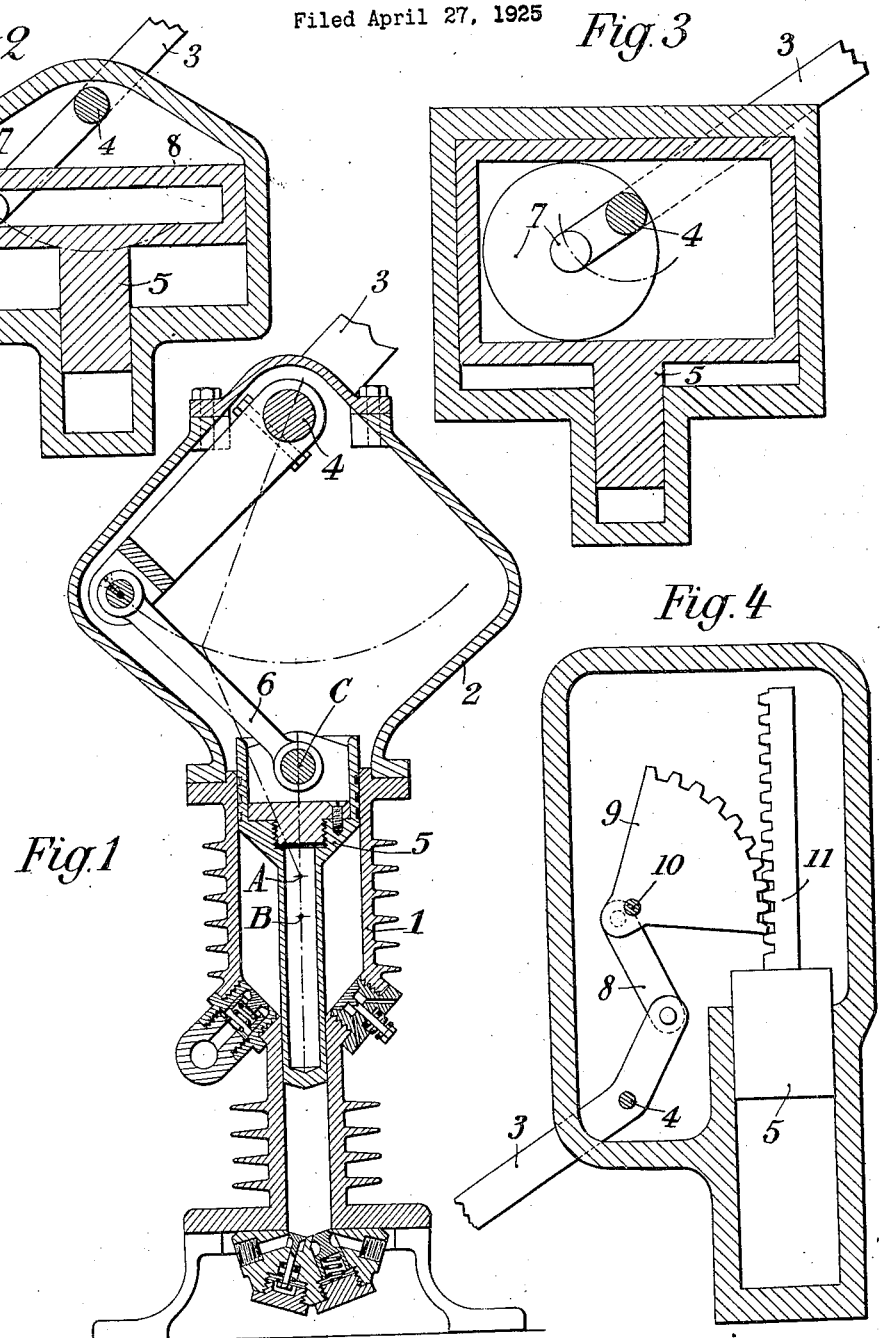

Patented Dec. 6, 1927.

1,651,913

UNITED STATES PATENT OFFICE.

PAUL VOREAUX, OF PARIS, FRANCE, ASSIGNOR TO SOCIÉTÉ ANONYME ETABLISSEMENTS SAMGA ET BAVOX REUNIS, OF PARIS, FRANCE.

HAND-ACTUATED AIR COMPRESSOR.

Application filed April 27, 1925, Serial No. 26,262, and in France May 5, 1924.

My invention has for its object an air compressor which is actuated by an oscillating lever in such a manner that with a normal and nearly constant effort, I may at will realize a large delivery under low pressure or a smaller delivery under greater pressure, without modifying the efficiency of the apparatus.

For this purpose, the operating lever is connected to the piston by means of such a joint that according as the amplitude of the oscillations of the lever is reduced, the stroke of the piston diminishes the dead space remaining constant.

By the fact that the lever is pivoted on a fixed point, its connection with the piston may be for example performed by means of a link, of a sliding member which moves in a slide which is at right angles to the piston axis, of a toothed sector controlled by a link, or by any other equivalent mechanism.

The annexed drawings represent, by way of example, various embodiments of my invention, the compressor being shown in section according to the axis of the piston.

In Fig. 1 the connection between the lever and the piston is performed by means of a link.

Figs. 2 and 3 show a device provided with a sliding member.

Fig. 4 refers to a control by means of a toothed sector and a rack-bar.

In Fig. 1 the compressor comprises a differential piston: 1 indicates the cylinder which is given two diameters and which is integral with the casing 2 upon which is pivoted the control lever 3 by means of a pivoting axle 4.

The said lever is connected with the piston 5 by means of a link 6, the length of which is such as when the said piston is in the position corresponding to the dead point, it bears against the heads of the cylinder 1.

Consequently whatever may be the amplitude of the lever oscillations on both sides of the vertical axis, the dead space is always the same.

It appears from the drawing, through the dash-and-dot lines which represent a second position of the elements, for an amplitude of oscillation of the lever reduced by a half of its length, that the piston stroke diminishes more rapidly than the said amplitude. The said stroke is in fact only equal to the distance AB which is much less than the half of the maximum stroke CB.

In these conditions, I may obtain a large delivery under low pressure by utilizing the complete stroke of the lever or a smaller delivery under a greater pressure by diminishing the said stroke, the efficiency of the compressor remaining constant.

In Fig. 2, the lever 3 carries at its end a crank pin 7 which slides in a slide 8 provided in the piston 5 perpendicularly to its axis; the same working conditions as above are still realized.

In Fig. 3, the device is the same as in the precedent case except in that the crank pin carries a roller 7 so as to constitute a cam. This disposition could also be replaced by an eccentric.

In order to obtain a long stroke of the piston without using a too large lever, I may amplify the displacement of the said piston by means of a device comprising a toothed sector and a rack bar (Fig. 4).

The lever 3, pivoting on the pivoting axle 4, is connected by means of a link 8 to a toothed sector mounted on a pivoting axle 10. The said sector engages a rack bar 11 which is secured to the piston 5.

Due to the control of the sector by means of a link, the piston stroke, as above stated, diminishes more rapidly than the amplitude of the displacements of the lever 3.

Obviously, one may conceive a great number of other devices for controlling the piston, according to the same principle and it is to be understood that it is not intended to confine the invention to the forms of embodiment herein disclosed.

It is to be observed that in the different arrangements represented, the piston is at the end of its compression stroke, when the control lever is in the middle of its angular stroke.

By the fact that the piston is always moved symmetrically on either side of its dead point position, one may be certain even when the amplitude of the said oscillation is reduced, that the lever passes over the said dead point and consequently that the piston is always carried into the end of its stroke, from which it results that I obtain with my said apparatus the constancy of the dead space and of a good efficiency.

Having thus described my apparatus, what I claim as new therein, and my own invention, is:

In a hand actuated air compressor, the combination of a pump cylinder, a piston in this cylinder, an operating lever adapted to oscillate about an axle at right angles with the axis of said cylinder, a crank upon the axle of oscillation of the said lever, a link articulated at one end to the said crank and at other end to the said piston, the said crank being adapted to oscillate on either side of the cylinder dead center about an angle not exceeding 45° on each side of the said dead center, the length of the said cylinder being limited to the stroke corresponding to this maximum oscillation.

In testimony whereof I have hereunto affixed my signature.

PAUL VOREAUX.